(12) United States Patent
Hudson et al.

(10) Patent No.: US 8,884,763 B2
(45) Date of Patent: Nov. 11, 2014

(54) THREAT DETECTION SENSOR SUITE

(75) Inventors: Edison Hudson, Chapel Hill, NC (US); Scott Lenser, Waltham, MA (US); Ivan Kirigin, Arlington, MA (US)

(73) Assignee: iRobert Corporation, Bedford, MA (US)

( * ) Notice: Subject to any disclaimer, the term of this patent is extended or adjusted under 35 U.S.C. 154(b) by 1824 days.

(21) Appl. No.: 11/905,624

(22) Filed: Oct. 2, 2007

(65) Prior Publication Data

US 2008/0136626 A1 Jun. 12, 2008

Related U.S. Application Data

(60) Provisional application No. 60/827,733, filed on Oct. 2, 2006, provisional application No. 60/957,711, filed on Aug. 24, 2007.

(51) Int. Cl.
| | |
|---|---|
| G08B 13/14 | (2006.01) |
| G05D 1/02 | (2006.01) |
| G01S 17/02 | (2006.01) |
| G01S 17/89 | (2006.01) |
| H04N 7/18 | (2006.01) |
| G01S 13/88 | (2006.01) |

(52) U.S. Cl.
CPC ............ G05D 1/0248 (2013.01); G01S 17/023 (2013.01); G01S 17/89 (2013.01); G05D 1/0242 (2013.01); H04N 7/185 (2013.01); G01S 13/888 (2013.01); G05D 1/0272 (2013.01); G05D 1/0274 (2013.01); G05D 1/0278 (2013.01); G05D 2201/0209 (2013.01)
USPC ....... 340/570; 318/560; 318/568.11; 73/23.2; 348/208.12

(58) Field of Classification Search
USPC ........ 340/632, 570; 315/560, 568.11, 568.12; 73/23.2, 23.5; 318/560; 348/208.12, 348/158
See application file for complete search history.

(56) References Cited

U.S. PATENT DOCUMENTS

| | | | | |
|---|---|---|---|---|
| 4,777,416 | A * | 10/1988 | George et al. | 318/568.12 |
| 5,325,031 | A * | 6/1994 | Tilden | 318/568.11 |
| 6,408,226 | B1 * | 6/2002 | Byrne et al. | 700/258 |
| 6,438,456 | B1 * | 8/2002 | Feddema et al. | 700/245 |
| 6,879,878 | B2 * | 4/2005 | Glenn et al. | 700/245 |
| 7,120,519 | B2 * | 10/2006 | Okabayashi et al. | 700/254 |
| 7,211,980 | B1 * | 5/2007 | Bruemmer et al. | 318/587 |

(Continued)

OTHER PUBLICATIONS

Yamauchi, Brian. "Daredevil: Ultra Wideband Radar Sensing for Small UGVs", In Proceedings of SPIE: Unmanned Systems Technology IX, Orlando, FL, Apr. 2007.

(Continued)

*Primary Examiner* — George Bugg
*Assistant Examiner* — Edny Labbees
(74) *Attorney, Agent, or Firm* — Myers Bigel Sibley & Sajovec, PA

(57) ABSTRACT

A sensor suite for a vehicle, the sensor suite comprising a 3D imaging system, a video camera, and one or more environmental sensors. Data from the sensor suite is combined to detect and identify threats during a structure clearing or inspection operation. Additionally, a method for detecting and identifying threats during a structure clearing or inspection operation. The method comprises: gathering 3D image data including object range, volume, and geometry; gathering video data in the same physical geometry of the 3D image; gathering non-visual environmental characteristic data; and combining and analyzing the gathered data to detect and identify threats.

4 Claims, 6 Drawing Sheets

(56) References Cited

U.S. PATENT DOCUMENTS

| | | | |
|---|---|---|---|
| 7,250,849 B2 * | 7/2007 | Spriggs et al. ............... | 340/435 |
| 7,436,143 B2 * | 10/2008 | Lakshmanan et al. ........ | 318/581 |
| 2004/0236468 A1 * | 11/2004 | Taylor et al. .................. | 700/245 |
| 2006/0290779 A1 * | 12/2006 | Reverte et al. ................ | 348/84 |

OTHER PUBLICATIONS

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator Interface for the Control of Multiple Semi-Autonomous UGVs", In Proceedings of the Association for Unmanned Vehicles Systems International. Orlando, FL, Aug. 2006.

Yamauchi, Brian. "Autonomous Urban Reconnaissance Using Man-Portable UGVs", In Proceedings of SPIE: Unmanned Ground Vehicle Technology VIII, Orlando, FL, Apr. 2006.

Yamauchi, Brian. "Wayfarer: An Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian et al., "Griffon: a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al., "Mobility Enhancements for Ballistically Deployed Sensors", In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

* cited by examiner

THREAT DETECTION SENSOR SUITE

This application claims priority to U.S. Provisional Patent Application Ser. No. 60/827,733, filed Oct. 2, 2006, and U.S. Provisional Patent Application Ser. No. 60/957,711, filed Aug. 24, 2007. Both applications are incorporated herein by reference in their entireties.

FIELD

The present invention relates generally to a sensor suite, and more particularly to device including a sensor suite that can sense visual and environmental characteristics for use in identifying a threat.

INTRODUCTION

Remote vehicles have found increasing use in reconnaissance, rescue, and remote operation applications, both in military and civilian use. Reasons for the usefulness of remote vehicles in these fields include their ability to transmit visual or other sensory information via cameras or other sensors to a remote terminal, the ability to operate remote vehicles from afar using radio or tether-based remote control, and the ability to manipulate objects remotely using a robotic arm or other manipulator mounted on the remote vehicle.

A present priority for U.S. military is development of a remote vehicle that can assist or replace soldiers in missions such as building, tunnel, sewer, and cave clearance, which have been identified as particularly dangerous endeavors. Remote vehicles can provide ground soldiers with a tactical advantage by detecting and mapping threats without exposing soldiers to harm.

Remote vehicles currently used to assist soldiers may include a thermal video, a range finder, a zoom color/low-light (NIR) video, and active illumination. None of these sensors provides adequate threat detection, autonomous navigation, obstacle avoidance, or mapping. In theory, presently deployed range finders might be a 3D aid, but include single range point designs and are intended primarily to aid in targeting.

Autonomous Navigation Systems (ANS) are presently being developed for large unmanned vehicles that support the ability for the vehicles to use LADAR and vision-based perception sensors to perceive surroundings and identify obstacles in the vehicle's path while navigating through a planned or unplanned path. ANS comprises three subsystems: 1) a LADAR mapping and imaging module; 2) an image processing (EOIR) module; and 3) a computing system embedded in the vehicle control system. The ANS LADAR module is a navigation sensor, used to digitize the forward path of the vehicle to detect passable regions and build local maps. Such a map created using LADAR produces ranges from the vehicle to objects, as well as information about the geometric size and shape of objects in the vehicle's path. Existing ANS subsystems are too heavy for deployment on smaller vehicles, typically weighing between 45-91 pounds. While lighter LADAR sensors exist (e.g., SICK LM), these lighter LADARS scan a single cross-sectional arc through the environment, returning a serial stream of point range data, which can be built into a 2D map of the environment. Adding mechanical "nodding" can allow generation of 3D data by acquiring successive arc lines of data as the sensors are moved orthogonally, but such systems are mechanically bulky and slow. In addition, they do not work well when the vehicle is moving across non-uniform, non-planar driving surfaces.

LADAR stands for to laser detection and ranging, which is also referred to as light detection and ranging (LIDAR).

SUMMARY

The present invention may address one or more of the above-mentioned issues. Other features and/or advantages may become apparent from the description which follows.

The present invention provides a sensor suite for a vehicle, the sensor suite comprising a 3D imaging system, a video camera, and one or more environmental sensors. Data from the sensor suite is combined to detect and identify threats during a structure clearing or inspection operation. The sensors collect data from the same physical geometry. The sensor suit can be included on a payload for a remote vehicle and the payload can be mounted on a pan-tilt. The 3D imaging system can include a Flash LADAR. The video camera can include an IR color imaging sensor and can be combined with gray-scale lower-resolution data produced by the Flash LADAR. The sensor suite can also comprise a thermal imager for sensing a heat register of a target. The one or more environmental sensors can include one or more of a spectrographically-based detector, a chemical fluorescence-based detector, and an ion mobility spectrometry-based detector. The sensor suite can include a through-wall sensor for detecting movement in an obscured area of a structure.

The present invention also provides a method for detecting and identifying threats during a structure clearing or inspection operation. The method comprises: gathering 3D image data including object range, volume, and geometry; gathering video data in the same physical geometry of the 3D image; gathering non-visual environmental characteristic data; and combining and analyzing the gathered data to detect and identify threats.

The present invention additionally provides a method for detecting and identifying threats during a structure clearing or inspection operation. The method comprises: detecting a target, identifying that the target is of interest; moving close enough to the target that one or more environmental sensors can be effective; gathering environmental characteristic data with the one or more environmental sensors; and combining and analyzing data gathered to identify the target. The method can also comprise moving toward the target until any legible markings can be determined, and determining legible markings. Determining legible markings can be accomplished by optical character recognition. Movement toward the target can be achieved by autonomous navigation. Identifying the target can comprise classifying the target as a threat.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

At least some features and advantages of the claimed subject matter will be apparent from the following detailed description of embodiments consistent therewith, which description should be considered with reference to the accompanying, wherein:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF VARIOUS EMBODIMENTS

Reference will now be made to various embodiments, examples of which are illustrated in the accompanying drawings. However, these various exemplary embodiments are not intended to limit the disclosure. To the contrary, the disclosure is intended to cover alternatives, modifications, and equivalents.

The present invention contemplates addressing a spectrum of threats that might commonly be confronted, for example by soldiers or first responders, during clearing or inspection of a building or other structure. A sensor toolkit is provided that focuses on detecting and identifying threats, while also allowing autonomous navigation, mapping, and localization, and pinpointing potential threats on the generated map. The sensors are coupled with a computational package to run necessary algorithms. The computational package can use, for example, iRobot's AWARE 2.0 robotic software architecture, or another suitable robot control system, such as that disclosed in U.S. patent application Ser. No. 11/832,616, filed Aug. 1, 2007, the entire content of which is incorporated herein by reference.

To facilitate such clearance/inspection tasks and other similar tasks, the sensor suite (or the remote vehicle otherwise) can include low light and/or thermal illumination for day and operations, and to operate in buildings, tunnels, and caves. A customized and specialized set of threat sensors can be integrated that optimally address the broadest range of foreseeable threats with minimized data gathering overlap.

Figure 1:
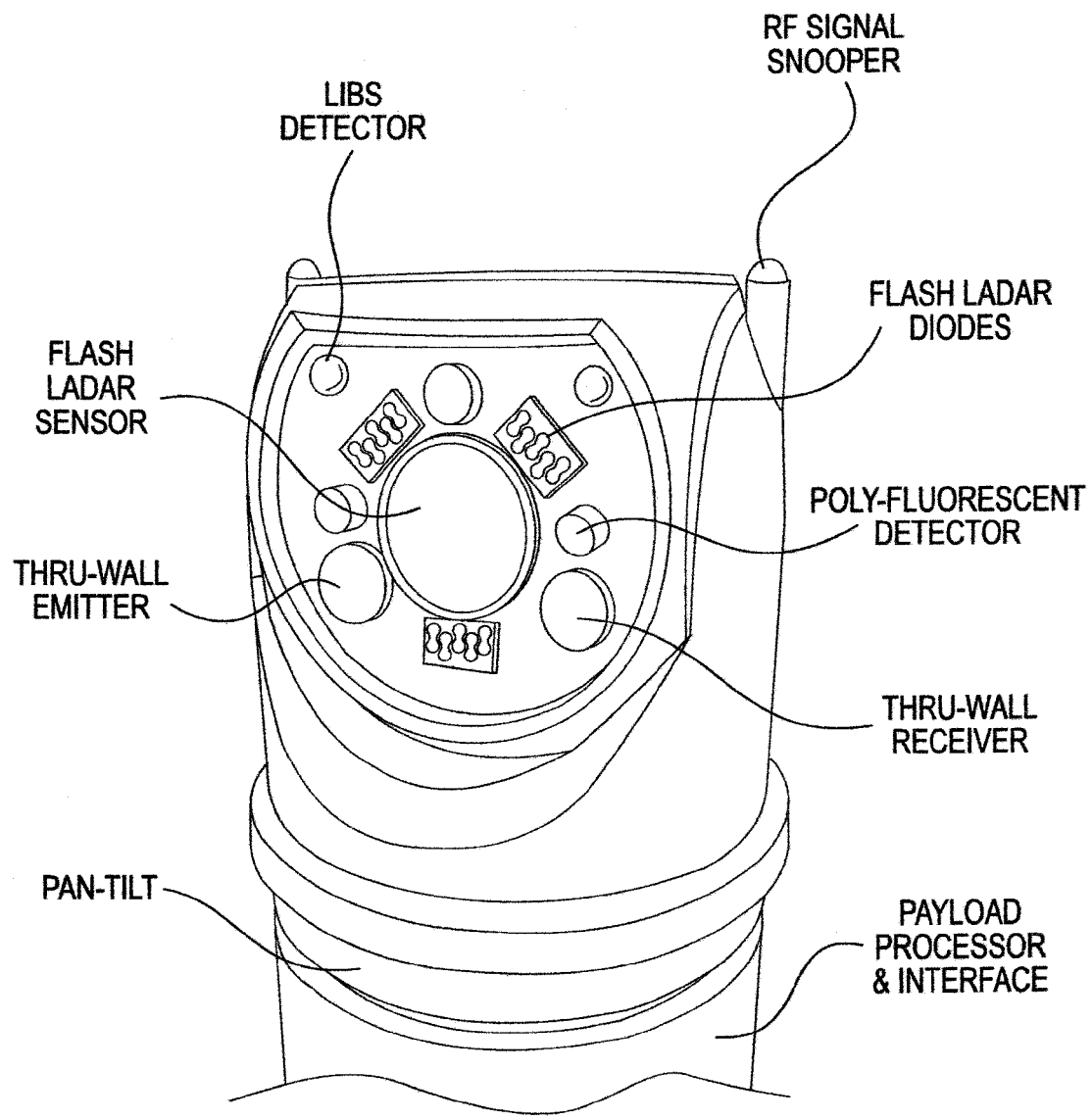
FIG. 1 illustrates an exemplary embodiment of a sensor suite in accordance with certain aspects of the present invention.
Figure 2:
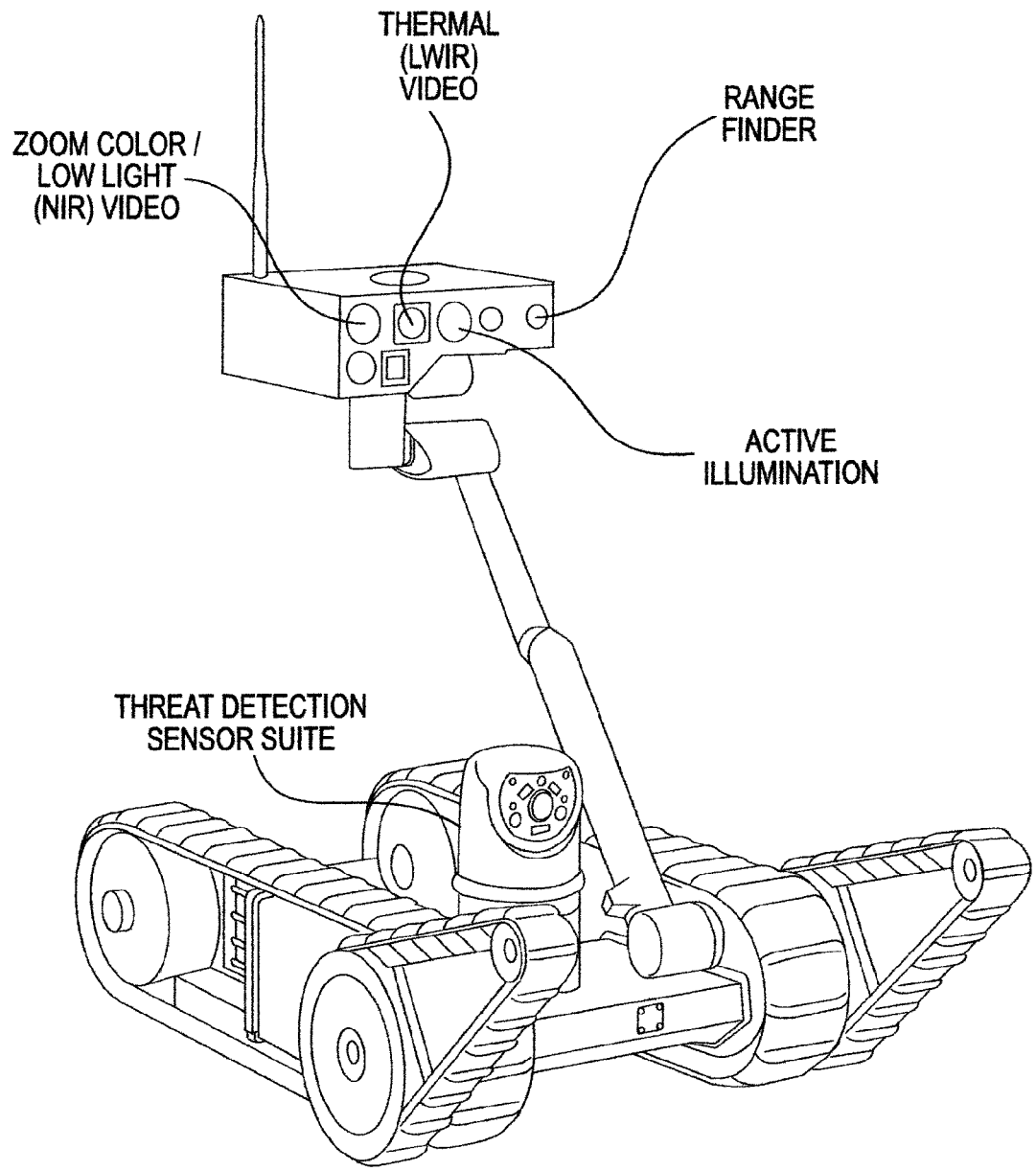
FIG. 2 illustrates an exemplary implementation of a sensor suite of the present invention included in a payload embodiment that is mounted on a remote vehicle.

FIG. 1 illustrates an embodiment of a sensor suite in accordance with certain aspects of the invention, the sensor suite being incorporated into a payload that can be mounted on existing vehicles or incorporated into future vehicle designs. Providing the sensor suite as a payload allows it to be modularized and packaged at both the hardware and software levels, which can provide a subsystem with clearly defined interfaces and functions. When attached to a vehicle, such a payload can upgrade that vehicle to have autonomous navigation capability and threat detection capability. FIG. 2 illustrates an exemplary implementation of such a payload, here a "head," on a remote vehicle.

As shown in FIG. 1, the payload includes a 3D imaging system such as Flash LADAR diodes and a sensor that determine object range, volume, and geometry, a thru-wall emitter and receiver, such as EMMDAR, that allow remote detection of the presence of people inside structures such as buildings or cavities within buildings that are obscured by walls, and an RF signal snooper that can detect RF signals to determine the presence of radios, room bugging, and/or explosives with RF detonators. One example of an RF signal snooper includes a Vanu Anywave Base Station, which can sense a variety of radio frequencies and modulation methods.

The illustrated sensor suite also includes one or more laser-induced breakdown spectroscopy (LIBS) detectors. LIBS is a type of atomic emission spectroscopy that utilizes a laser pulse as an excitation source. LIBS can analyze any matter, regardless of its physical state. Because all elements emit light when excited to sufficiently high temperatures, LIBS can detect all elements, limited only by the power of the laser and the sensitivity and wavelength range of the spectrograph & detector.

The illustrated sensor suite additionally includes one or more poly-fluorescent vapor phase detectors (a chemical fluorescence-based detector) tuned to detect explosives, rocket propellants, gun powders, warfare agents, and toxic gases. Other types of chemical detectors, as described below, can additionally or alternatively be included in the sensor suite in accordance with the present invention.

In certain embodiments of the invention, the sensors are combined, focused, and calibrated in the same physical geometry, to the extent possible based one the individual sensor capabilities, so that they are obtaining information regarding the same physical geometry.

In various exemplary embodiments of the invention, the sensor suite can be panned horizontally and/or vertically, for example by being mounted on a pan-tilt. A pan-tilt can increase scope and speed of operation, as well as navigational flexibility. As the sensor suite is panned horizontally and vertically, the sensors obtain readings from a larger field of view but can remain focused and calibrated in the same physical geometry so that they continue to obtain information regarding the same physical geometry.

A slow-moving-rugged panning mount (or pan-tilt) provides for a full field of view for navigation, mapping, and threat detection. Techniques such as Iterative Closest Point (ICP) can power the statistical methods of Simultaneous Localization and Mapping (SLAM) to merge measurements over time. These techniques may be enhanced with commonly available tools on remote vehicles, such as low precision INS, GPS, and vehicle odometry.

A sensor suite processor and interface are also provided, making the illustrated payload a self-contained subsystem. Modularizing the entire building clearing concept into a payload such as a hand-held-sized head, and providing a well-defined interface (mechanical, network, and data), makes it possible to deploy the sensor suite onto a variety of vehicle platforms at many points in technology readiness.

3D imaging systems, such as a Flash LADAR, capture scene information in a single shot while the remote vehicle is in motion. Flash LADAR scans a collimated laser beam over a scene, illuminating the entire scene with diffuse laser light. A Flash LADAR image captures all range pixels in an area image frame simultaneously, so that they are geometrically in exact relation to each other, eliminating the need for calculating a registration for each range sample. In addition, because only one laser pulse is needed for each frame, the average laser power required is less, comparable with that needed for a single-pixel scanned LADAR approach, making a Flash LADAR eye-safe and relatively stealthy. Further, Flash LADAR can generate time-resolved 3D movies for increased target information. The Flash LADAR may be manufactured by, for example, SwissRanger, ASC, CSEM, PC-Tech, or Canesta. ASC's Flash LADAR generates full area frames that freeze an entire environment in instantaneous flashes without mechanical scanning. Current ASC Flash LADAR sensors generate 128×128 range data arrays at up to 30 Hz and are solid state, making them less subject to mechanical vibration. The data captured using Flash LADAR enables generation of data needed for teleoperation, navigation (including autonomous navigation that may include obstacle avoidance), object identification, and environment mapping.

Figure 6:
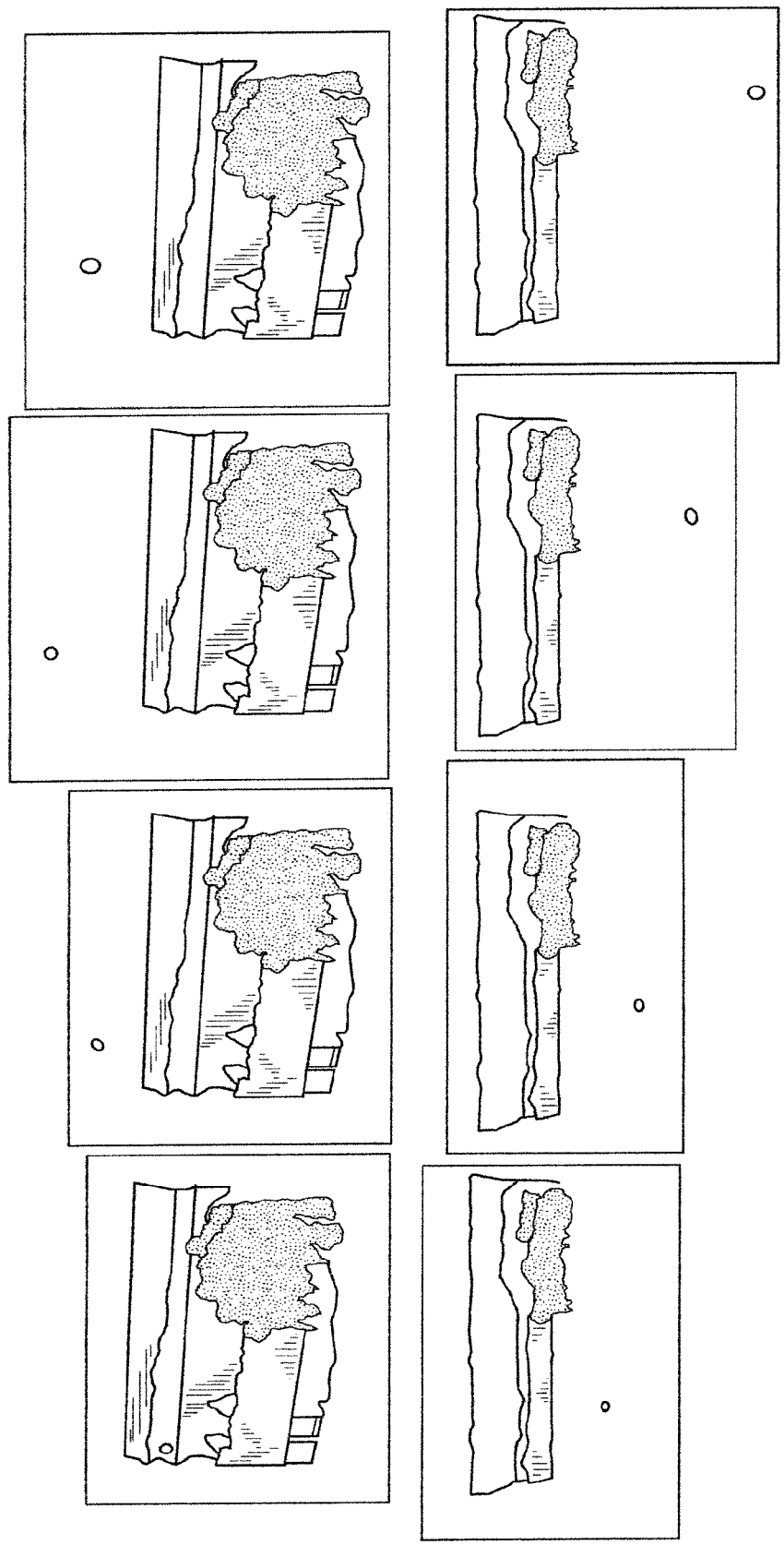
FIG. 6 illustrates an exemplary embodiment of tracking of a football using flash LADAR.

In addition to object identification, Flash LADAR can be used for object tracking. FIG. 6 illustrates tracking of a football using Flash LADAR. Sequential frames from two orientations—the side (upper frame series) and top (lower frame series) of the same 3D 128×128 array data—illustrate the technology. To obtain two orientations, the 3D frame can be rotated, obtaining the side and top views, for example. Because the x, y, and z values of the object can be obtained by software rather than the mechanical rotation of a tracking head, all the tracking can be accomplished in software.

Tracking of single and multiple objects—such as of a pedestrian walking and lying in a background of moving vehicles—can be achieved. Other applications, such as RPG tracking can also be achieved.

Due to the full geometry capture provided by Flash LADAR, it can perform object classification and recognition when combined with the texture, thermal, and color information by other sensors focused in the same physical geometry. Such a capability may help locate specific types of threats; for example, the shape, size and color of Russian/Chinese made RPG and launcher is well known, and could be recognized from 3D geometry and surface coloration. Thus, RPG identification and tracking are available.

Figure 4:
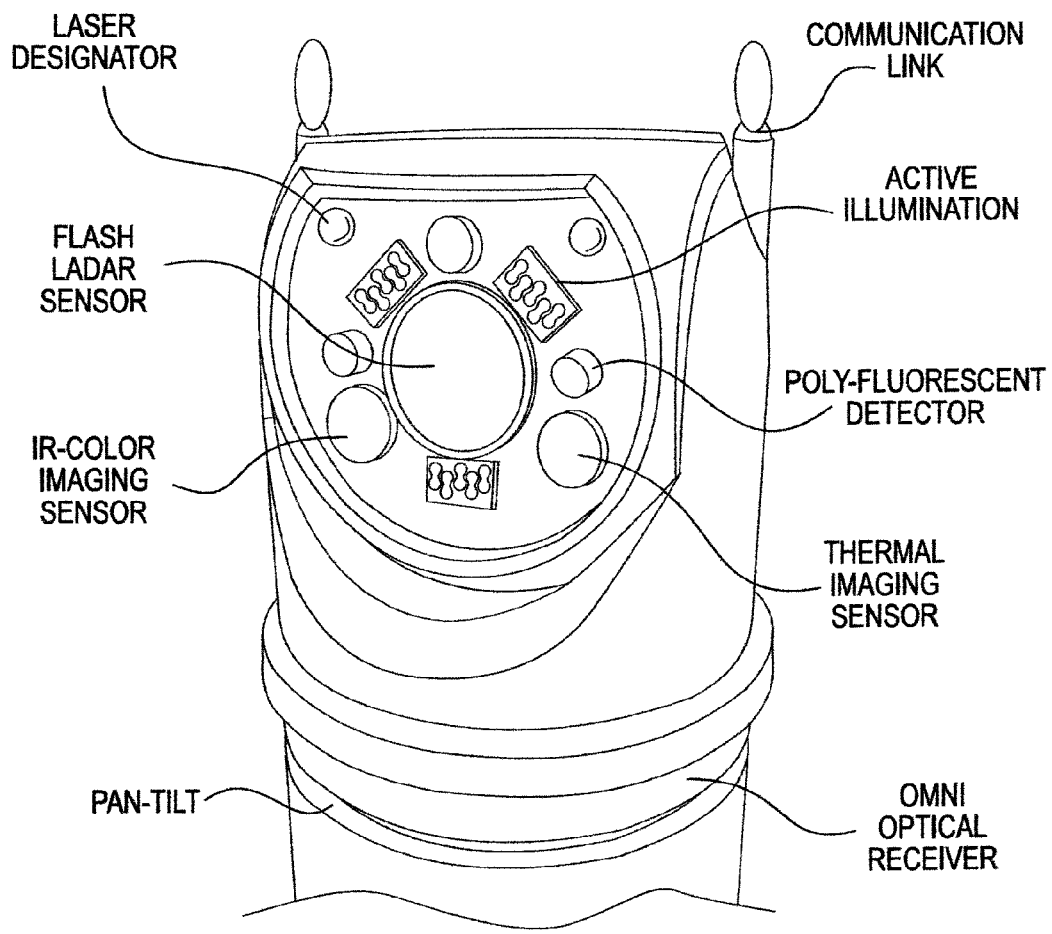
FIG. 4 illustrates another exemplary embodiment of a sensor suite in accordance with certain aspects of the present invention.

In accordance with an exemplary embodiment of the sensor suite illustrated in FIG. 4, the sensor suite can include a video camera such as a minimal VGA (640×480) or XGA (or higher) color video for combination with the Flash LADAR's grayscale lower-resolution data. The video can be bore-sighted with the Flash LADAR. A thermal imager, such as a micro-bolometer, could additionally be included in the sensor suite and bore-sighted, as the heat register of a target can be an important identifier. Further, a communication link can be provided with the sensor suite for transmission of the gathered data and/or receipt of data such as remote control.

Figure 5:
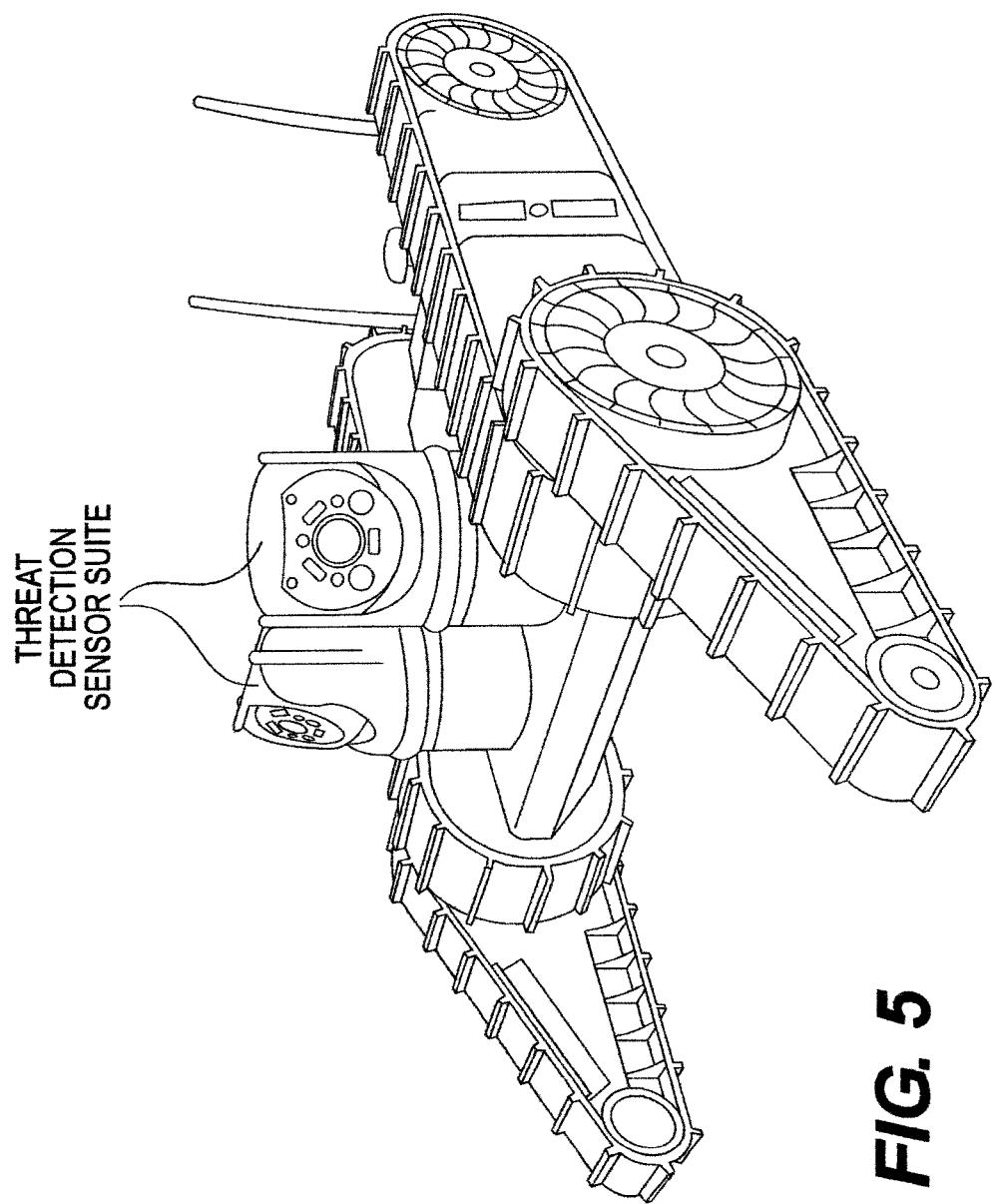
FIG. 5 illustrates another exemplary implementation of sensor suites of the present invention included in payload embodiments that are mounted on a remote vehicle.

FIG. 5 illustrates a remote vehicle including two payloads housing sensor suites in accordance with the present invention. The sensors suites illustrated are pointed in different directions and can be identical for fast information accumulation, or can be complimentary to provide additional types of information. Complimentary sensor suites can be arranged to sense the same physical geometry rather than facing in different directions as illustrated. It is to be understood that the present invention contemplates any number of sensors suites combined to provide the information needed for threat detection and other desirable information gathering and behaviors.

Certain embodiments of the present invention contemplate combining the data gathered by the Flash LADAR, perhaps with the video data, with environmental sensors that provide additional data that can assist in identifying a threat. Environment sensors are typically non-directional (although they can benefit from being directed into the same physical geometry as the Flash LADAR and other sensors) and, in certain embodiments of the invention, include one or more of the following types of chemical sensors: 1) spectrographically-based detectors; 2) chemical fluorescence-based detectors; and, 3) ion mobility spectrometry-based detectors. A spectrographically-based detector can include, for example; a Raman spectrometer. Raman spectroscopy is a spectroscopic technique used to identify chemical compounds by studying their vibrational, rotational, and other low-frequency modes. Most chemical agents have Raman signatures that can be identified. A chemical fluorescence-based detector identifies a chemical compound by analyzing its fluorescence. One example of a chemical fluorescence-based detector includes the Icx™ Nomadics Fido® explosives detector, which can detect explosive vapor at levels as low as a few femtograms. Ion mobility spectrometry (IMS)-based detectors can detect and identify very low concentrations of chemicals based on the differential migration of gas phase ions through a homogeneous electric field, and can include, for example, the Smiths Detection Sabre 4000 hand-held detector for explosives, chemical agents, toxic industrial chemicals, and narcotics.

Other threat detection sensors can include photoionization detectors (PID) for broad-range toxic gas detection, and/or scintillation and fluorescence detectors for detecting radioactive or nuclear materials. In general, a variety of properly-sized chemical sensors can be employed in a sensor suite in accordance with the present invention to allow correlation of the geometric, surface coloration, and chemical composition of identified targets when the object is close enough to the sensor suite to be in focus. When deployed on a mobile vehicle and in accordance with an exemplary embodiment of the present invention, the sensor suite allows detection of a target, identification that the target is of interest (e.g., via its geometry as determined using LADAR, perhaps combined with video), movement toward the object until any legible markings can be determined (e.g., via optical character recognition (OCR) if provided in the sensor suite), and then possibly moving close enough to the object, if warranted, that chemical sensors can be effective. Movement toward the object can be achieved via teleoperation or autonomous navigation.

In one example of threat detection during a building clearance operation, through-wall sensing locates a person moving and then confirms detection using integrated electro-optic infrared (EOIR) thermal and near infrared (NIR) sensors. In another example of sensors in a suite acting together, the Flash LADAR and video data might detect a potential explosive device. If other (e.g., chemical) sensors additionally detect an explosive compound, that additional corresponding parameter helps to make identification of the target as an explosive device more certain.

Figure 3:
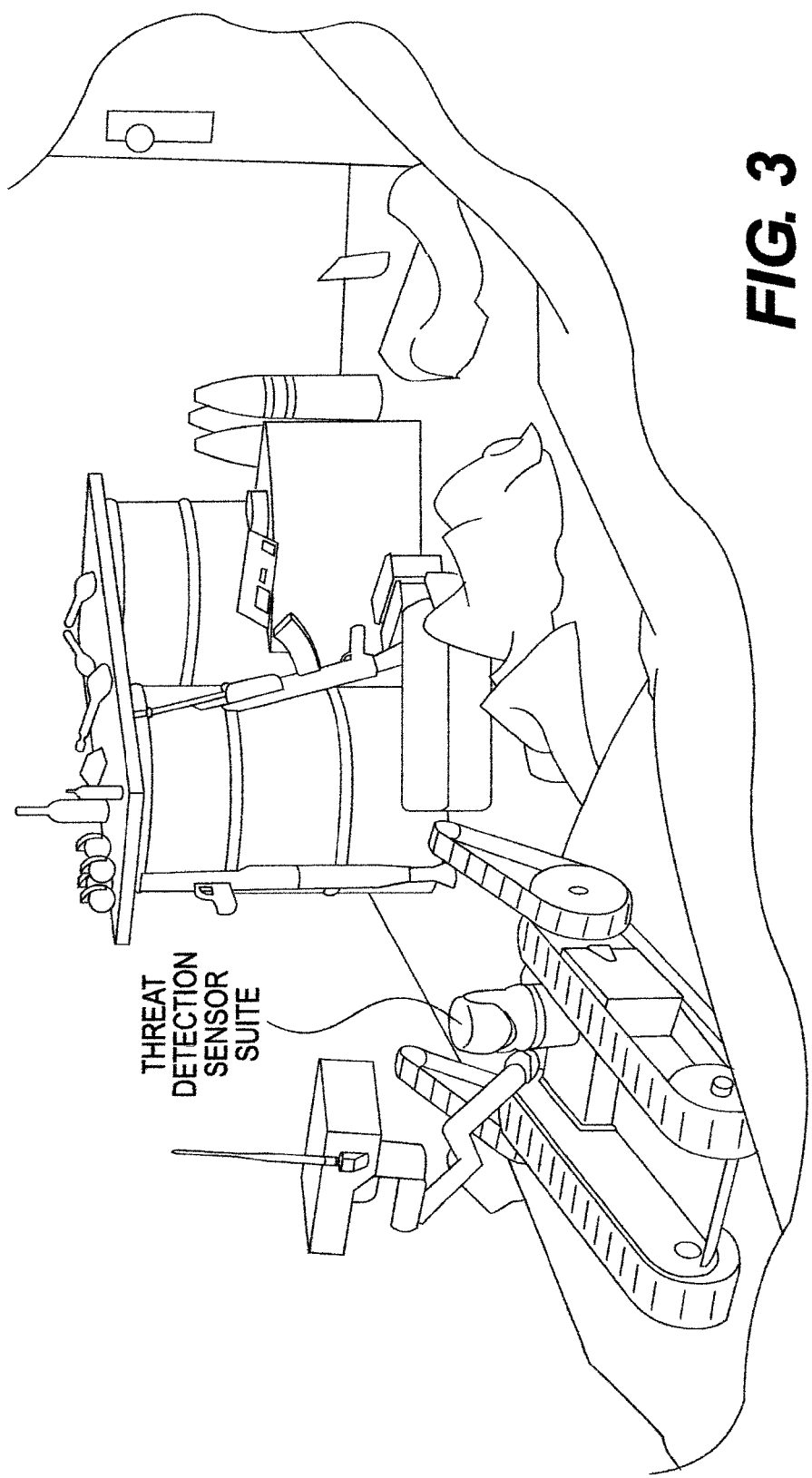
FIG. 3 illustrates the exemplary implementation of FIG. 2 being used in a building clearance inspection mission.

FIG. 3 illustrates the exemplary implementation of FIG. 2 being used in a building clearance/inspection mission. The remove vehicle has located an IED-makers hideaway.

Some exemplary embodiments of the present invention also contemplate the inclusion of sniper/shooter detectors such as, for example, those employing biometric acoustic localization and identification. The above list of environmental sensors to be used as threat detectors is meant to be exemplary and non-limiting. Various additional sensors can be utilized in a sensor suite in accordance with the present invention.

As stated above, some exemplary embodiments of the invention include the ability to perform simultaneous localization and mapping (SLAM) or otherwise map the structure being cleared while making threat assessments. As the remote vehicle moves through the structure, the mapping process can occur in parallel with threat searching. Use of Flash LADAR data for autonomous navigation and mapping is discussed in U.S. patent application Ser. No. 11/826,541, filed Jul. 16, 2007, the entire content of which is incorporated herein by reference.

The present invention also contemplates prioritizing searches, so that faster mapping of specifically-identified threats can be achieved. For example, in a search for people within a structure, these arch and mapping can be informed and focused to a smaller target area by detection of the presence of mover and breathers using through-wall sensors such as electromagnetic motion detection and ranging (EM-MDAR) sensors or breathing detection ultra-wide band (UWB) sensors.

Various exemplary embodiments of the present invention contemplate use of the sensor suite payload on a variety of vehicles in addition to the broad category of remote vehicles referred to above. For example, the sensor suite payload can be used on manned ground and air vehicles as well as unmanned (remotely-controlled) ground and air vehicles. In certain embodiments of the invention, the payload is for use on a highly-mobile, reconfigurable, man-packable small robot system weighing less than 30 pounds.

While the present invention has been disclosed in terms of preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It is noted that, as used in this specification and the appended claims, the singular forms "a," "an," and "the," include plural referents unless expressly and unequivocally limited to one referent. Thus, for example, reference to "a restraint device" includes two or more different restraint devices. As used herein, the term "include" and its grammatical variants are intended, to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope its teachings. Other embodiments of the disclosure will be apparent to those skilled in the art from consideration of the specification and practice of the teachings disclosed herein. It is intended that the specification and examples be considered as exemplary only.

What is claimed is:

1. A method for detecting and identifying threats during a structure clearing or inspection operation performed with an autonomous remote vehicle, the method comprising:
    mounting a self-contained threat detection sensor suite payload on the remote vehicle, the threat detection sensor suite comprising a processor configured to run executable software for performing autonomous and semi-autonomous behaviors for the structure clearing or inspection operation;
    detecting a target;
    identifying that the target is of interest;
    moving toward the target until any legible markings can be determined;
    determining legible markings, wherein determining legible markings is accomplished by optical character recognition;
    moving close enough to the target that one or more environmental sensors can sense environmental characteristics of the target;
    gathering environmental characteristic data with the one or more environmental sensors; and
    combining and analyzing data gathered to identify the target.

2. The method of claim 1, wherein identifying that the target is of interest includes identifying its geometry as determined using 3D imaging and video.

3. The method of claim 1, wherein moving close enough to the target is achieved by autonomous navigation.

4. The method of claim 1, wherein identifying the target comprises classifying the target as a threat.

\* \* \* \* \*

UNITED STATES PATENT AND TRADEMARK OFFICE
CERTIFICATE OF CORRECTION

PATENT NO. : 8,884,763 B2
APPLICATION NO. : 11/905624
DATED : November 11, 2014
INVENTOR(S) : Hudson et al.

Page 1 of 1

It is certified that error appears in the above-identified patent and that said Letters Patent is hereby corrected as shown below:

On Title Page:
Item (73) Assignee: Correct "iRobert" to read -- iRobot --

Signed and Sealed this
Fourteenth Day of April, 2015

Michelle K. Lee
*Director of the United States Patent and Trademark Office*